United States Patent

Riser et al.

[11] Patent Number: 5,857,041
[45] Date of Patent: Jan. 5, 1999

[54] OPTICAL COUPLER AND METHOD UTILIZING OPTIMAL ILLUMINATION REFLECTOR

[75] Inventors: Andrew P. Riser, Ramona, Calif.; Ronald F. Rykowski, Woodinville, Wash.; Stephen S. Wilson, San Juan Capistrano, Calif.

[73] Assignee: Remote Source Lighting International, San Juan Capisrano, Calif.

[21] Appl. No.: 599,970

[22] Filed: Feb. 14, 1996

Related U.S. Application Data

[63] Continuation-in-part of Ser. No. 374,163, Jan. 17, 1995, Pat. No. 5,559,911.
[51] Int. Cl.⁶ .............................. G02B 6/26; G02B 5/10; F21V 7/04
[52] U.S. Cl. .............................. 385/31; 385/33; 385/39; 385/47; 385/901; 362/32; 359/868
[58] Field of Search .................. 385/31, 33, 34, 385/39, 47, 88, 92, 93, 94, 900, 901; 362/32, 61; 359/868

[56] References Cited

U.S. PATENT DOCUMENTS

| | | | |
|---|---|---|---|
| 4,050,784 | 9/1977 | Cibie | 362/32 |
| 4,389,698 | 6/1983 | Viola | 362/32 |
| 4,704,660 | 11/1987 | Robbins | 362/32 |
| 4,811,171 | 3/1989 | Viola | 362/32 |
| 4,811,172 | 3/1989 | Davenport et al. | 362/61 |
| 4,816,975 | 3/1989 | Bahnemann et al. | 362/308 |
| 4,851,969 | 7/1989 | Davenport et al. | 362/61 X |
| 4,868,718 | 9/1989 | Davenport et al. | 362/32 |
| 4,912,605 | 3/1990 | Whitehead | 362/32 |
| 4,949,227 | 8/1990 | Finch et al. | 362/61 |
| 4,958,263 | 9/1990 | Davenport et al. | 362/32 |
| 4,961,622 | 10/1990 | Gorman et al. | 385/33 X |
| 5,096,281 | 3/1992 | Windebank et al. | 359/868 |
| 5,222,793 | 6/1993 | Davenport et al. | 385/32 |
| 5,259,056 | 11/1993 | Davenport et al. | 385/115 |
| 5,367,590 | 11/1994 | Davenport et al. | 385/901 X |
| 5,396,571 | 3/1995 | Saadatmanesh et al. | 385/33 |
| 5,559,911 | 9/1996 | Forkner et al. | 385/33 |

FOREIGN PATENT DOCUMENTS

| | | | |
|---|---|---|---|
| 2651283 | 5/1978 | Germany | 362/32 X |
| 2098311 | 11/1982 | United Kingdom | 385/901 X |

*Primary Examiner*—Brian Healy
*Attorney, Agent, or Firm*—Donald E. Stout

[57] ABSTRACT

An optical fiber manifold is provided for coupling light from an illumination source to a plurality of spaced, large diameter output fibers, or "light pipes", which are used for a variety of purposes, such as illuminating pools, spas, hazardous material zones, jail cells, and other applications where direct lighting is dangerous, difficult to maintain, or subject to vandalism. The manifold employs an illumination reflector(s) which has been customized to maximize the efficiency of light transmission between the illumination source, such as an arc lamp, and the cores of the plurality of output fibers. A method of fabricating the customized illumination reflector includes mapping the radiation patterns of the particular illumination source to be utilized, creating a database of those radiation patterns, and utilizing the database to generate an optimal illumination reflector configuration. The computer-generated reflector will virtually always be a non-conic section, because the illumination source is not ideal.

23 Claims, 4 Drawing Sheets

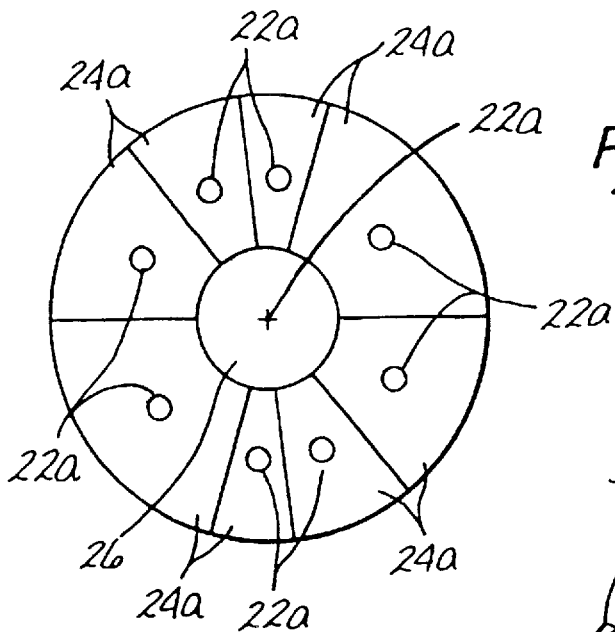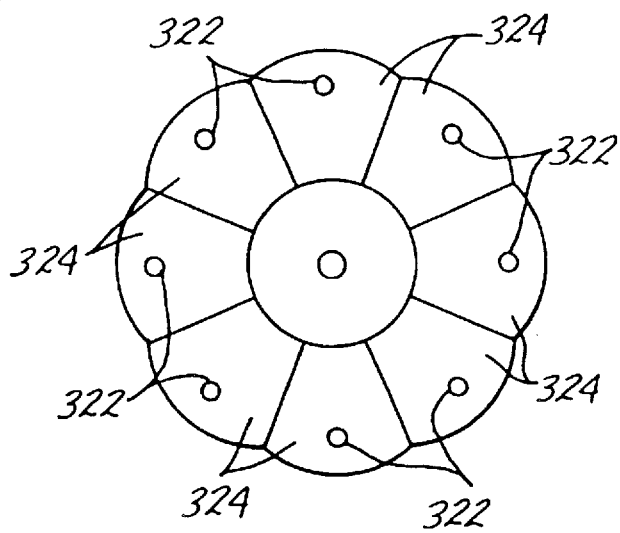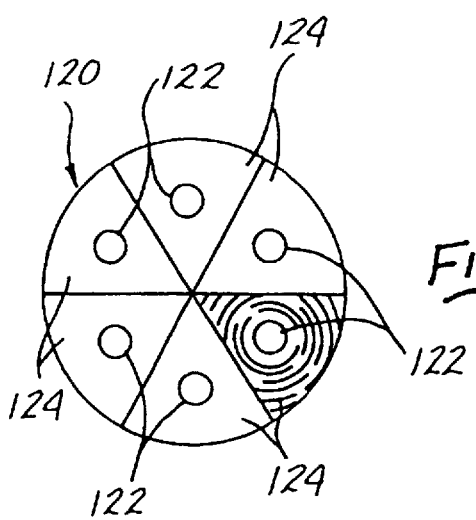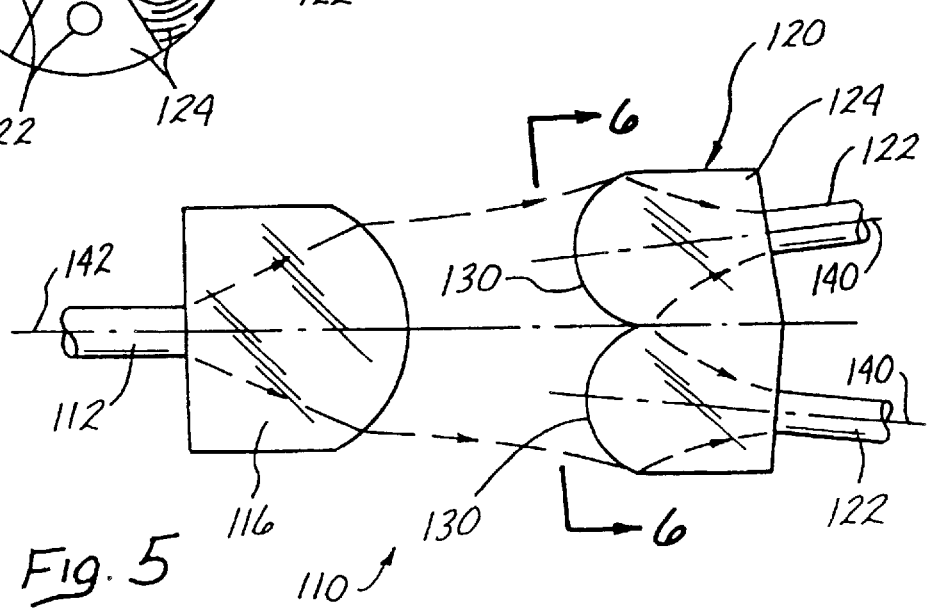

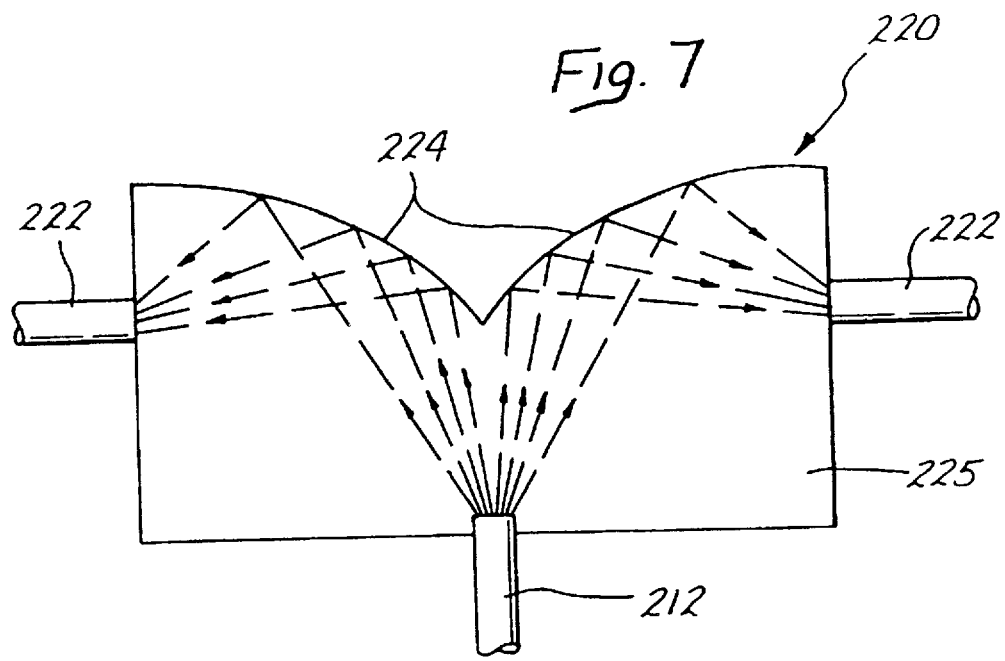
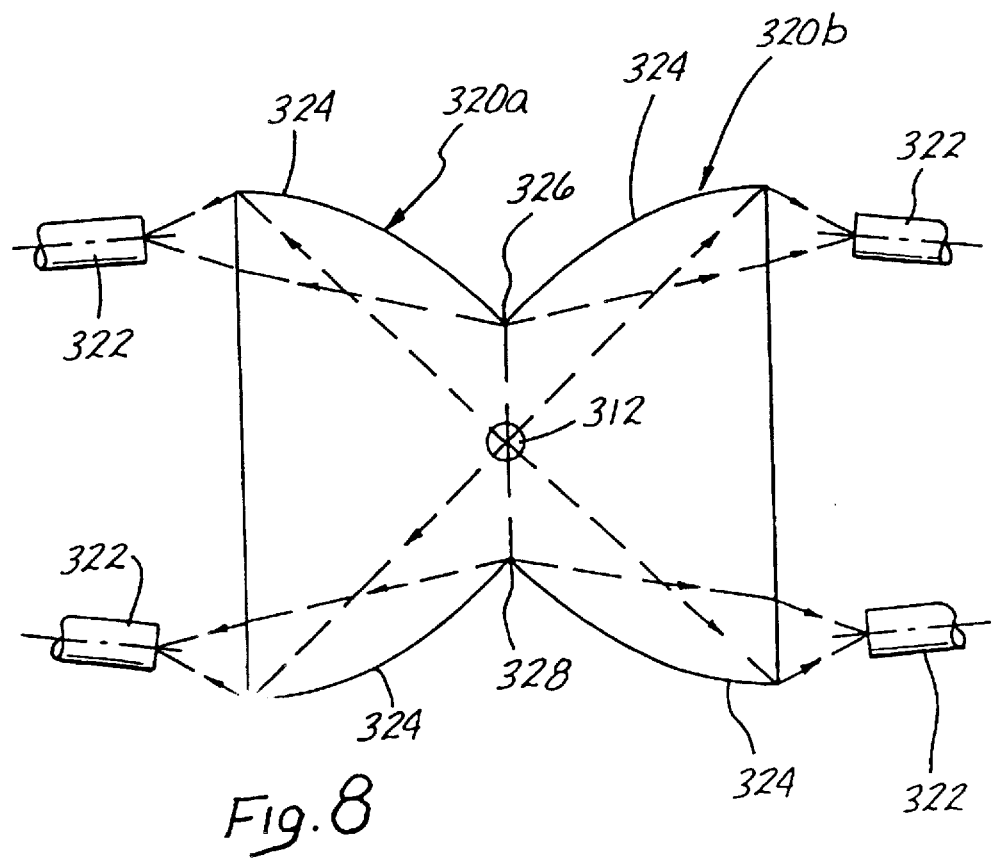

OPTICAL COUPLER AND METHOD UTILIZING OPTIMAL ILLUMINATION REFLECTOR

This application is a continuation-in-part of U.S. Ser. No. 08/374,163, entitled Optical Coupler and filed on Jan. 17, 1995, now U.S. Pat. No. 5,559,911.

BACKGROUND OF THE INVENTION

Large diameter fiber optics, often referred to as "flexible light pipes", are well known in the art, and typically comprise a single, solid core fiber which is surrounded by a cladding layer and a sheath or shielding layer. The core is the portion of a light pipe which transmits light, and typically has a diameter of about 2 to 12 mm. It is formed of a very soft, semi-liquid plastic material, such as OPTIFLEX®, which is manufactured by Rohm & Haas Corporation, of Philadelphia, Pa. The cladding layer typically comprises polytetrafluoroethylene (PTFE or TEFLON®), or the like, while the outer sheath is fabricated of a material such as polyvinylchloride (PVC). Unlike small diameter optical fibers, which are typically used to transmit information in relatively complex control systems, these large diameter "light pipes" are typically employed in a variety of illumination systems where direct lighting is difficult to maintain, dangerous, or subject to vandalism. Examples include architectural lighting, display cases, pools and spas (to eliminate electrical connections near water), hazardous material zones (to eliminate the need for sealed lighting), or jail cells. They are particularly advantageous in that only a single centralized illumination system must be maintained, rather than a plurality of individual lights.

There are problems, however, in implementing such light pipe illumination systems because of the difficulty of illuminating a plurality of light pipes from a single illumination source. In order to maximize efficiency, the optical fibers must be bundled as closely as possible, to ensure the maximum ratio of core area (the part of each light pipe which actually transmits light) to total area. However, bundling the large diameter light pipes together in order to illuminate them from the single illumination source is difficult to do efficiently. Each of the individual light pipes are round and thus have a great deal of space between them due to the cladding and shielding layers. This problem is illustrated in prior art FIG. 1, wherein a bundle 2 of large diameter optical fibers or light pipes 4 is shown. Each optical fiber 4 comprises a core 6, a cladding layer 7, and a shielding layer or sheath 8, as described above. To obtain maximum efficiency, it is desirable to illuminate only the core 6 of each of the bundled optical fibers 4. Necessarily, if the light from the source of illumination is spread across the array of optical fibers, it will illuminate not only the cores 6 of the optical fibers 4, but also the cladding layers 7 and the shielding layers 8.

Furthermore, the voids 9 between the optical fibers, which are inevitable because of the fibers' round dimensions, also are impacted by the light from the illumination source. All of the light falling upon any element other than the cores 6 is wasted, and becomes an efficiency loss, since it will not be transmitted by the fibers. Additionally, packing the fibers so closely together creates problems such as mechanical difficulties in configuring and accommodating the illumination system and difficulties encountered in attempting to replace one of the individual bundled fibers. This design also typically results in color variation between fibers unless techniques are specifically employed to prevent this problem.

One prior art solution, variations of which have been disclosed in parent application U.S. Ser. No. 08/374,163, now U.S. Pat. No. 5,559,911, U.S. Pat. No. 5,396,571 to Saadatmanesh et al., and U.S. Pat. No. 5,222,793 to Davenport et al., for example, is to illuminate only the core of each output fiber, rather than illuminating the entire optical fiber bundle. Such an approach is advantageous, for example, because by preventing the incidence of light on other optical fiber elements, such as the shielding or cladding layers, as well as voids between fibers, the efficiency and light output of the illumination system is greatly increased. Also, because the whole image of the arc of the lamp is received by each individual fiber, rather than collectively on a bundle of fibers so that each fiber receives a different part of the arc, color variation between fibers is eliminated. Furthermore, using such a concept, it is possible to space the optical fibers, rather than bundling them, which multiplies their versatility in various applications.

One disadvantage of these recent systems, however, is their use of illumination reflectors to transmit light between the source of illumination and the output optical fibers which are based upon classic conic sections; i.e. elliptical or parabolic reflectors. Such reflectors are best for "ideal" light sources; i.e. "point" sources, but for "real world" light sources, light transmission efficiency is reduced.

SUMMARY OF THE INVENTION

This invention is an improvement over the prior art described above, because it employs an illumination reflector(s) which has been customized to maximize the efficiency of light transmission between the illumination source, such as an arc lamp, and the cores of each of the plurality of output fibers. A method of fabricating the customized illumination reflectors includes mapping the radiation patterns of the particular illumination source to be utilized, creating a database of those radiation patterns, and utilizing the database to generate an optimal illumination reflector configuration. The computer-generated reflector will virtually always be a non-conic section, because the illumination source is not ideal.

More particularly, an optical fiber manifold for coupling light from an illumination source to a plurality of output optical fibers is disclosed. Each output optical fiber has a proximal end for receiving the light, and the manifold includes an illumination reflector for receiving illumination from the illumination source and redirecting the illumination to the proximal ends of each of the output optical fibers. The illumination reflector is particularly designed to complement the illumination source with which it is paired, and therefore has a computer-generated non-circular cross-section and is both non-elliptical and non-parabolic.

In another aspect of the invention, a method of fabricating an illumination reflector for an optical fiber manifold is disclosed. Steps in the method include mapping the radiation patterns of the illumination source, and creating a database of these radiation patterns. Then, the database is used to generate an illumination reflector configuration which provides an optimal distribution and intensity of illumination at a proximal end of each of the output optical fibers.

In yet another aspect of the invention, an optical fiber manifold for coupling light from an illumination source to a plurality of output optical fibers is disclosed, wherein each of the output optical fibers has a proximal end for receiving the light and the manifold comprises a lens having a plurality of segments which each have a discrete focal point. Each of the segments have a longitudinal axis coincident with the principal local propagation vector of the light received from the illumination source, and is adapted to converge the light from the illumination source to its respective focal point. The proximal end of each of the optical fibers is located at the focal point of a corresponding lens segment for receiving light therefrom. The manifold has a longitudinal principal axis, and it will often be the case that the axis of at least one of the lens segments will not be parallel to the longitudinal axis of the manifold.

BRIEF DESCRIPTION OF THE DRAWING

FIG. 5 is a schematic side view of a second alternative embodiment of the invention, illustrating a splitter for coupling light from a first optical fiber to a plurality of branch output optical fibers, using a multi-sectored lens;

FIG. 6 is an end view along lines 6—6 of the multi-sectored lens shown in FIG. 5;

FIG. 7 is a schematic top view of a third alternative embodiment of the invention, illustrating a splitter for coupling light from a first optical fiber to a plurality of branch output optical fibers, using a multi-sectored reflector;

FIG. 8 is a schematic side view of a fourth alternative embodiment of the invention, illustrating an illumination source, a multi-sectored reflector, and a plurality of output optical fibers;

FIG. 9 is an end view of the multi-sectored lens illustrated in FIG. 4; and

FIG. 10 is an end view of the multi-sectored reflector illustrated in FIG. 8.

DESCRIPTION OF THE PREFERRED EMBODIMENT

Figure 1:
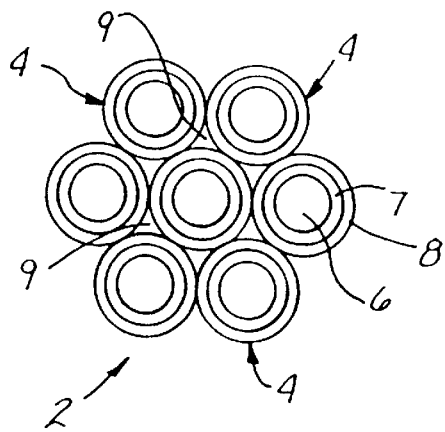
FIG. 1 is a prior art end view of a bundle of large diameter optical fibers, illustrating the structure of each fiber, including sheathing, cladding, and core.
Figure 3:
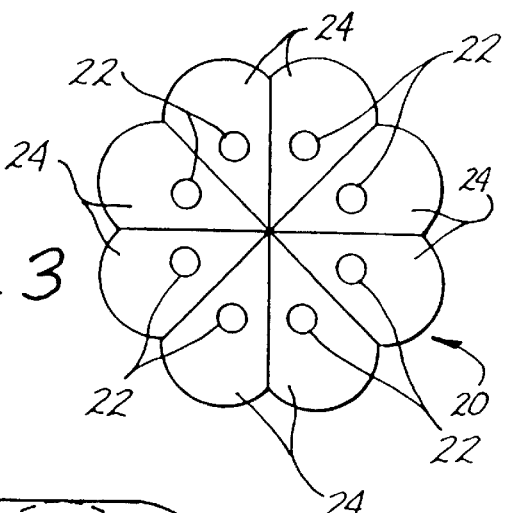
FIG. 3 is an end view along lines 3—3 of the multi-sectored lens shown in FIG. 2.
Figure 2A:
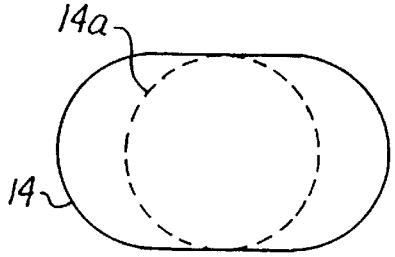
FIG. 2a is a cross-sectional view taken along lines 2a—2a of FIG. 2, particularly illustrating the illumination reflector fabricated in accordance with the principles of this.
Figure 2:
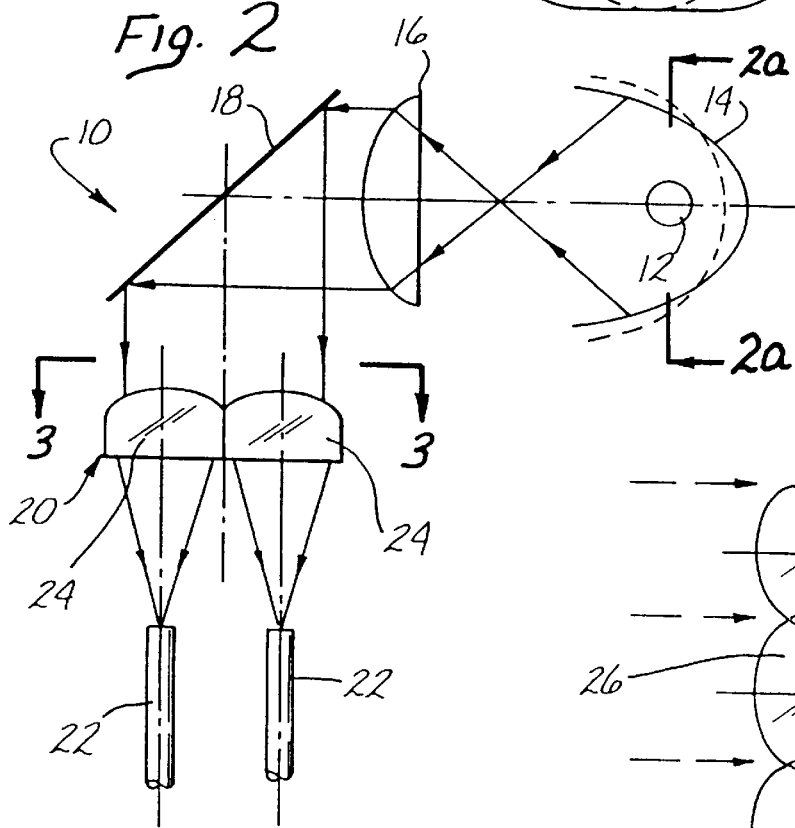
FIG. 2 is a schematic top view of a first embodiment of the invention, illustrating an illumination source, an illumination reflector, a multi-sectored lens, and a plurality of output optical fibers.

Referring now more specifically to the drawings, FIGS. 2, 2a, and 3 illustrate an optical fiber manifold constructed in accordance with the principles of the invention, which includes a source of illumination 12, comprising any conventional light source, such as an arc lamp or the like. An illumination reflector 14, which in the illustrated embodiment is integral with the lamp 12, reflects the light from the lamp through a collimating lens 16. The light exiting the collimating lens 16 is then reflected by a fold mirror 18 to a scalloped segmented lens 20. The fold mirror 18 may be provided with a cold mirror coating to eliminate any light in the infrared or ultra violet spectra, if desired. The light from the fold mirror 18 is transmitted by the segmented lens 20 to a plurality of spaced output optical fibers 22. An important feature of the invention is that the number of segments or sectors 24 and the number of output fibers 22 correspond. Each lens segment 24 is adapted to converge or focus the light received from the source 12 to a spot at the inlet plane of its corresponding output fiber 22 which has a beamwidth no wider than the fiber core. Thus, each optical fiber 22 receives light only from a single corresponding segment 24, as shown by the ray tracings in FIG. 2. The illustrated preferred embodiment is designed to illuminate eight individual fibers 22, so there are eight segments 24, but the number of segments or fibers may vary.

An important aspect of the invention, which substantially improves the efficiency of the inventive system, is the use of non-classical, non-conic sections in the design of the illumination reflector 14. In the prior art, in contrast, classical conic sections are typically used in illumination reflector design, to create elliptical or parabolic reflectors. By way of background, classical conic sections are so-named because they can be generated (and perhaps more importantly, visualized) by imagining the plane that would be exposed by slicing through a circular section cone. For example, if such a cone is sliced through with a cut that is exactly perpendicular to the long axis of the cone, the resulting exposed plane is a circle. This is the simplest example of a conic section. Like the other conic sections, the circle can be described algebraically, in this case by the expression:

$$(x^2+y^2)^{1/2}=r \qquad (1)$$

wherein r is the radius of the circle, x is the x-coordinate value of the radius, and y is the y-coordinate value of the radius. In other words, the radius magnitude of the circle is always equal to the square root of the sum of the squares of its x-y coordinate values. The properties which this confers on the circle is that it has a single focal point equidistant from the locus of its circumference points, and that focus is in the center. This characteristic can be quite useful in optics.

If the slicing plane of the theoretical cone were to be tilted away from the perpendicular to the axis, other classical conic shapes are generated, not much more complex in mathematical description than the circle, but with ever more intriguing properties. From the standpoint of the history of optical design, two of the most important are the ellipse and the parabola.

The ellipse is a closed oval, and can be imagined by looking at the shape the edge of a circular coin makes as it is progressively tilted with respect to the observer's line of sight. The ellipse has the properties of having two focal points, or foci, both located along the line bisecting the ellipse's long axis (the circle is actually a special case of the ellipse, where the two foci are superimposed on one another, occupying the same point in space). The optical properties of an ellipse are such that any rays of light originating from exactly the point of focus on one side of the ellipse will be brought exactly to convergence at the complementary focus location, irrespective of their direction of origin.

Unlike the ellipse, the parabola is an open-figured shape. It is generated by slicing the cone along a line parallel to its long axis, all the way down to its base. The resulting shape has a vertex at the small end and an open mouth opposite. The parabola has but a single focus. Its optical properties are such that a ray of light leaving the exact point of focus and bouncing off the surface of a parabolic reflector will exit the open mouth going exactly parallel to the long axis of the parabola, no matter where the ray strikes the reflector. Flashlight reflectors are often parabolic; by collimating the light (i.e. making all the rays travel parallel paths), the flashlight beam can be directed where it is needed and deliver the most light to the area of interest, instead of illuminating a large area dimly, as a non-directed bulb would do.

As a collector of light, the parabola has the ability to take collimated light directed toward it and concentrate that light at the focus point. This makes parabolic shapes useful for solar energy collectors.

The inventors have discovered, however, that the problem with using classical elliptical and parabolic reflectors, as contemplated in the prior art, is that, while the above analysis is done based upon ideal assumptions; i.e. that the light source occupies a "point" in space in the purest mathematical sense, in that it is dimensionless. If a light source used to illuminate an elliptical or parabolic reflector could occupy a dimensional space of zero, the easily-described, well-behaved "ideal" properties of these shapes would be realized. However, such a light source is impossible in the physical world; a light source of zero dimension would, by definition, be infinitely bright. In the physical world, a light source is a very real, three-dimensional object, whether it is the tungsten filament of an incandescent lamp, the arc of an arc lamp, or the glowing surface of a fluorescent lamp. Compared to the theoretically ideal "point source", all of these emitters of light are not only large, but generally of complex, and sometimes bizarre, shape.

What this means is that an "ideal" conic or parabolic reflector using a "real" light source not only doesn't conform to its theoretically predicted performance, but often diverges wildly from the expected behavior. In the prior art, this discrepancy between the theoretical and the realized behavior of conic-shape-based reflectors is just a tough fact of life. No good analytical tools have existed to help understand it, and no design tools existed to help overcome it.

The inventive new non-traditional approach utilizes non-conic sections. The designer is freed from the artifice of employing classical, easily-described shapes whose real-world performance may be fatally compromised, and given the freedom to use non-classical shapes, difficult to describe mathematically but amenable to analysis by the considerable number-crunching power of modem personal computers.

Thus, the inventive method for fabricating the reflector 14 shown in FIGS. 2 and 2a begins with the mapping of the complex radiation patterns of the real lamp 12 to be utilized in the particular apparatus. In a customized application, the lamp actually used in each individual device might actually be individually mapped. However, more typically, a particular manufacturer's lamp, designated by model number, is mapped, and the vagaries between individual lamps of a particular model or type of lamp, typically quite small, are ignored for the sake of manufacturing practicality and reasonable cost. Mapping, in this sense, means to generate a collection of spatial intensity distribution measurements at a constant radial distance from the lamp. This is done by moving a calibrated imaging detector array around the source in spherical coordinates until a detailed data file is obtained, point-by-point, of the lamp's specific radiation patterns. This detailed file doesn't really care about the relative "idealness" of the source; rather, the file contains a description of the radiation patterns emitted by the source, which are, by definition, what the reflector surface will actually "see".

Once the mapping process is complete, computer software is used to play the file containing the lamp's complex three-space emission pattern against the surface of any arbitrarily defined reflector surface, whether a classic conic section or not, whether round (a surface of rotation) or not, whether comprised of smooth curves or an array of discrete facets. The result of playing the lamp's real radiation patterns against the real reflector surface yields a highly accurate prediction of exactly what the resulting radiation product will look like at any point in space. The prediction can include the light intensity at any point, the rate of change of intensity between arbitrary points in the field, the angles of incidence of light through a given point, and other relevant measurements. This analytical power affords the ability to tailor the lamp/reflector combination to best satisfy the illumination requirements of the particular application, both in spatial intensity and angular distribution.

Referring again particularly to FIGS. 2 and 2a, reference numeral 14 denotes an exemplary non-conic illumination reflector which might be generated using the method described above. Reference numeral 14a denotes, in contrast, a classic conic illumination reflector, having a circular cross-section (FIG. 2a) which might be used in the prior art. The deviation of the shape of reflector 14 from a surface of revolution of a classic conic section has been exaggerated for illustrative purposes.

Another advantage of the non-conic illumination reflector 14 designed and fabricated in accordance with the principles of this invention is the ability to utilize higher intensity light at the fiber end face without burning the fiber ends. Optical beams do not naturally have a uniform intensity distribution across the beam. Imperfections in optical systems can produce peaks and other nonuniformities. Even in ideal systems the intensity distribution will tend toward a Gaussian distribution. A Gaussian beam has a peaked intensity distribution described by $$I=e^{-x} \qquad (2)$$

where I is the intensity of the beam and x is the distance from the center of the beam. Lasers are naturally Gaussian. Other light beams will approach Gaussian as they are diffracted in an optical system.

The existence of intensity peaks when light is launched into an optical fiber can result in fiber burning. This in turn limits the maximum power that can be safely launched into a fiber. For example, when a beam of light is directed onto the end of a bundle of fibers the center fiber(s) tend to burn because intensity of the light is peaked near the center.

The non-conic illumination reflector shapes generated by the inventive methods not only compensate for the shape of the lamp but also produce a more uniform intensity distribution at the fiber end face. This permits the safe use of higher intensity levels without burning the fiber ends.

It should be noted that this technique for mapping the radiation patterns of a light source, and developing a database from which a reflector may be designed for an illumination system, is not limited to fiber optic applications. It is also useful for other types of illumination applications, such as projection systems, for example. Furthermore, the database which is developed from the mapping process may be used to fabricate customized lenses as well as reflectors, if desired.

Another significant feature of the invention is that if the collimated beam approaching the segmented output lens 20 is de-centered with respect to the lens, then the relative intensity to the several output fibers can be varied in a controllable manner. This inventive feature may provide a number of advantages, as there are many instances when there is a need to controllably vary the amount of light to each fiber. For example, the ability to controllably allocate different amounts of light to each fiber may provide a means for compensating for light loss through fibers of different lengths coming from the same coupler manifold. Thus, if it is desired to illuminate spaced lamps along a hallway from a single central illumination source, then fibers of different lengths must be used to couple the illumination to each of the hallway lamps. Because of varying losses, the hallway lamps would each be at a different intensity if the losses could not be compensated for in some manner. The ability to de-center the collimated beam in a controllable manner would provide one means for compensating for these varying losses, and to ensure uniform light intensity from each lamp.

Figure 4:
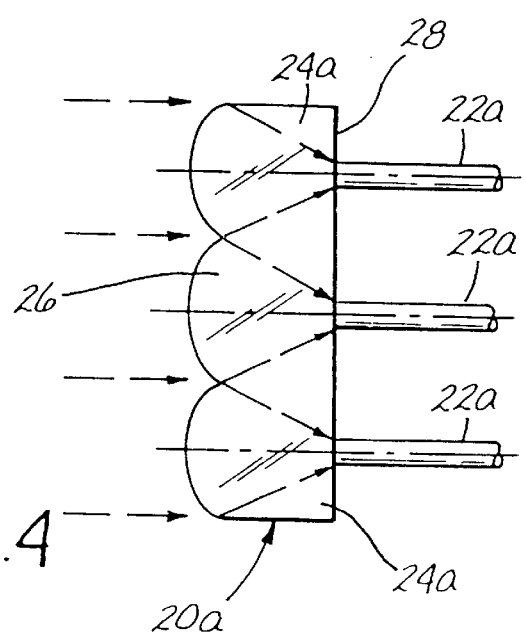
FIG. 4 is a schematic side view of an alternative embodiment of the invention, illustrating a multi-sectored lens and a plurality of output optical fibers, wherein each output optical fiber is in abutting relationship with a corresponding lens sector.

FIGS. 4 and 9 illustrate an alternative embodiment of the invention shown in FIG. 2, wherein like components are designated by the same reference numeral, followed by the letter "a". The segmented lens 20a comprises an array of outer segments 24a, as well as a central lens 26. Each lens segment 24a, as well as the central lens 26, correspond to an output optical fiber 22a, in the same manner shown and described in FIG. 2. The employment of a central lens is sometimes advantageous in that the outer segment lenses consequently have a smaller diameter, resulting in the ability to couple into smaller output fibers 22a.

Another difference between lens 20a and lens 20 of FIG. 2 is that, in contrast to the lens 20, the lens 20a comprises asymmetrical, rather than symmetrical, outer lens segments 24a. This asymmetrical distribution provides an additional advantageous means for controllably varying the light intensity transmitted to each output fiber 22a. Each lens segment 24a subtends a different angle, and therefore different areas of incident light, so consequently delivers to its corresponding output fiber a quantity of light proportionate to its size. Thus, the asymmetrical lens segment distribution illustrated in FIG. 9 permits control of the light intensity to each output fiber without de-centering the collimated beam, by instead determining the lens segment size which will be required for each output fiber, relative to the sizes required for the other output fibers, and sizing each lens segment accordingly.

Yet another difference between the lens 20a of FIG. 4 and the lens 20 of FIG. 2 is that the lens 20a is adapted to directly abut the output fibers 22a at a lens/optical fiber joint 28 (FIG. 4). This is an important advantage, in that it minimizes the light losses due to Fresnel reflections from the segmented lens 20a to the output fibers 22a. To be possible, a segmented lens 20a is required wherein each segment has a short, internal focal length so that the light to be transmitted to each output fiber is focused at the exit plane of the lens to a beamwidth which is no greater than the diameter of the fiber core.

In certain applications, where the lens and the output fibers are comprised of different materials, even a directly abutting relationship may result in some Fresnel reflections, because of their variant refractive indices, so that some light losses are still inherent in the system. These can be further minimized, if desired, by applying an anti-reflective coating to the lens 20a to match the material of the optical fiber. The coating may comprise any desired well known anti-reflective coating, such as a multi-layer dielectric coating.

Of course, it should be understood by one of ordinary skill in the art that each of the advantageous features discussed in connection with the FIG. 4 embodiment could be employed independently of the other features, or in combination with only one of the other features, as desired.

FIGS. 5 and 6 illustrate yet another alternative embodiment of the invention, wherein like components are designated by the same reference numeral, preceded by the numeral 1. The inventive optical fiber manifold 110 comprises a splitter, coupling light from a source comprising a large single fiber 112 through a collimating lens 116 and a segmented lens 120 to a number of smaller output fibers 122. In this embodiment, the collimating lens 116 comprises a hyper-hemispherical lens having an aplanatic spherical surface with zero spherical aberration and coma, and is affixed directly to the source fiber 112. Of course, another type of collimating lens, such as that shown in FIG. 2, could be used as well. Also, it should be noted that in this embodiment, as in the other lens embodiments of FIGS. 2 and 4, each segment 124 of the segmented lens 120 preferably has a spherical or aspheric lens surface 130, for the purpose of minimizing distortion.

FIG. 7 shows a splitter embodiment similar to that illustrated in FIG. 5, wherein like components are designated by the same reference numeral, preceded by the numeral 2. The primary difference between the two embodiments is that a segmented reflector 220, rather than a segmented lens, is employed to couple the light from a large diameter source fiber to a plurality of smaller diameter output or branch fibers 222. In this embodiment, each segment 224 may be created by "cutting" the surface of the reflector (which is preferably elliptical) into sections, and rotating each section about the axis of the source fiber 212, so that the focal point of each section is off-axis. Alternatively, the reflector segments 224 may be fabricated using the techniques described supra with respect to reflector 14 of FIG. 2, so that the segments 224 are non-elliptical and specifically designed by mapping the radiation patterns of the light source; i.e. the source fiber 212. A corresponding output fiber 222 is then located at the focal point to receive the light collected by that section, which is focused to a single spot so that only the core of the corresponding fiber optic 222 is illuminated. The manifold is preferably contained in a housing 225, fabricated of clear plastic, though other materials could be used as well. Although two segments 224 and branch fibers 222 are illustrated, any number of both could be employed, though they should preferably correspond. Also, as in the case of the segmented lens, the segments 224 may be symmetrical or asymmetrical, depending upon the application and the desired controllability of the illumination intensity to each output fiber. If it is desired to locate one or more of the output fibers in an orientation different than that shown, such as in a generally parallel orientation to that of the source fiber, one or more fold mirrors may be employed to re-orient the reflected light.

FIGS. 8 and 10 illustrate another alternative embodiment wherein like components to those of previous embodiments are designated by the same reference numeral, preceded by the numeral 3. In this embodiment, a segmented reflector array is utilized to couple the light from a source to a plurality of output fibers. A source of illumination 312, which may, for example, comprise an arc lamp, is located at the common center of two reflectors 320a and 320b, which are oriented back-to-back. Output fibers 322 are arranged in surrounding relationship to the illumination source 312 to receive light from the reflectors 320a and 320b, which together comprise a plurality of segments 324, each of which corresponds with one of the output fibers. The elliptical center or vertex region of each reflector 320a and 320b is removed, as shown, and the two reflectors are joined at two intersection points 326 and 328. Again, in the preferred embodiment, the reflector segments 324 are non-elliptical and are generated using the inventive method of mapping the radiation patterns of the light source 312, then generating a specific reflector configuration which maximizes the efficiency of the resultant system, as discussed supra, although the segments 324 may of course be fabricated using standard elliptical reflectors, if desired.

By using back-to-back reflectors around a lamp 312, a high degree of collection angle can be achieved, with relatively low magnification, because the vertex of the reflector (which produces the highest magnification) is eliminated. By reducing magnification, a smaller spot size can be achieved without increasing the angles of the light directed to the spot. This is ideal for converging energy onto the core of a relatively small fiber.

Again, in this design, any number of fold mirrors may be employed to redirect the reflected light, if desired. Additionally, while eight output fibers 324 are shown, any number of segments and fibers could be employed within the scope of the invention. As in all of the disclosed embodiments, the output fibers are spaced, which improves adaptability of the system to numerous applications over prior art systems where bundling of the output fibers is required. Also, spacing the fibers greatly enhances thermal dissipation characteristics of the fibers.

Figure 11:
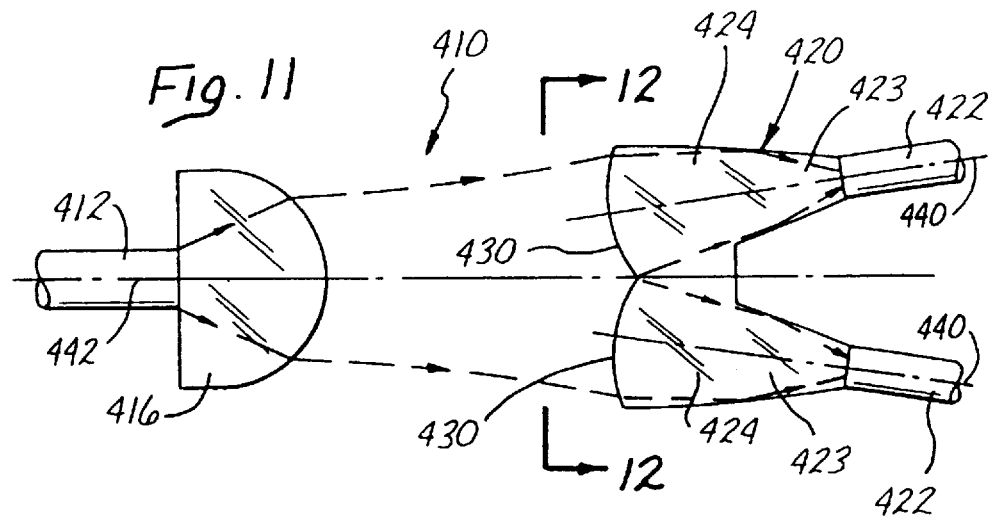
FIG. 11 is a schematic side view of a fifth alternative embodiment of the invention, illustrating a splitter utilizing a multi-sectored lens.
Figure 12:
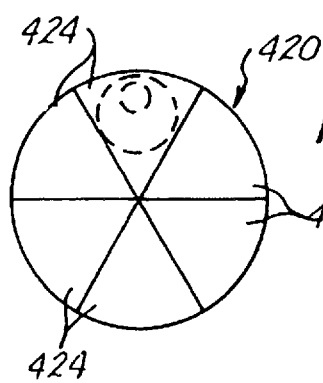
FIG. 12 is an end view along lines 12—12 of FIG. 11.

Still another alternative embodiment is shown in FIGS. 11 and 12, wherein like components to those of previous embodiments are designated by the same reference numeral, preceded by the numeral 4. In this embodiment, the optical fiber manifold 410 comprises a splitter similar to that shown in FIG. 5, which couples light from a source comprising a large single fiber 412 through a collimating lens 416 and a segmented lens 420 to a number of smaller output fibers 422. The primary difference between this embodiment and that of FIG. 5 is that in the FIG. 10 embodiment, the segmented lens 420 includes tapered light pipe (optical fiber) extensions 423 at the output end of the lens segments 424. The tapered light pipe sections of the output lens system generate a significant part of the light beam compression. Therefore, a less severely curved aspheric lens surface 430 may be used at the front end of the lens 420. This reduces lens surface aberrations and allows higher optical compression or "gain" to be achieved. The inventive configuration also has a tangential benefit of reducing the volume of plastic in the lens and eases molding.

Figure 14:
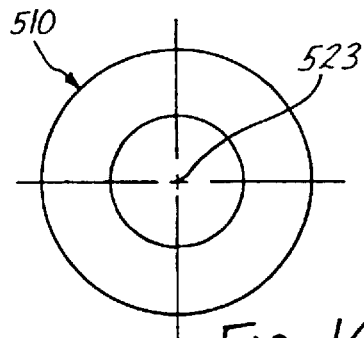
FIG. 14 is an end view of the multi-sectored reflector illustrated in FIG. 13.
Figure 13:
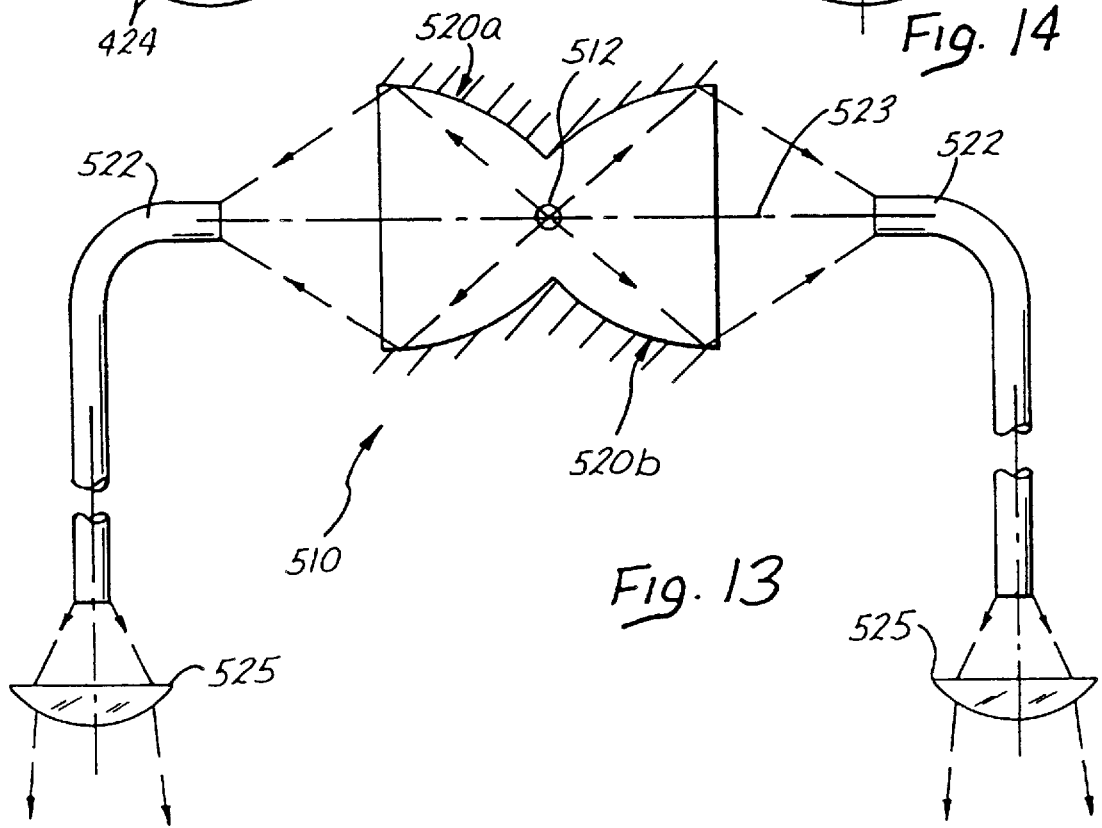
FIG. 13 is a schematic side view of a sixth alternative embodiment of the invention, illustrating an illumination source, a multi-sectored reflector, and a plurality of output optical fibers.

A sixth alternative embodiment is illustrated in FIGS. 13 and 14, wherein like components to those of previous embodiments are designated by the same reference numeral, preceded by the numeral 5. In this embodiment, which is similar to that illustrated in FIG. 8, a segmented reflector array is utilized to couple the light from a source to a pair of coaxial output fibers. More specifically, a source of illumination 512 is located at the common center of two reflectors 520*a* and 520*b*, which are oriented back-to-back, and are preferably non-elliptical, as discussed above Output fibers 522 are located coaxially with the illumination source 512 along the optical axis 523 of the optical fiber manifold 510. The primary difference between the FIG. 13 and FIG. 8 embodiments is that the reflector surface is circularly symmetric about the optical axis 523, as illustrated in FIG. 14, rather than scalloped. The reflectors are adapted to equally illuminate the two fibers 522 for applications such as automobile headlights or for lighting opposite ends of a long hallway. In the embodiment illustrated, the reflected light travels through the output fibers 522 and then is focused by a beam focusing lens 525 onto the element desired to be illuminated. The dual reflector surface has the same efficiency advantages as discussed with respect to the FIG. 8 embodiment; i.e. elimination of the high magnification vertex region of the two reflectors with the attendant improved concentration of light onto the fibers.

Still another advantageous feature of the invention is best shown in the embodiments of FIGS. 5 and 11. In FIG. 5, for example, it can be seen that the lens segments 124 each have a longitudinal axis 140 which is oriented to be non-parallel to the longitudinal axis 142 of the fiber 112 (which is coincident with the principal axis of the optical fiber manifold), in order to align the principal axis of each lens segment with the principal local propagation vector of the light received from the light source (note the light rays drawn to designate the light vector in FIG. 5). A similar orientation of the lens segments 424 can be seen in FIG. 11, wherein the longitudinal axis 440 of each lens segment is non-parallel to the longitudinal axis 442 of the fiber 412. This arrangement, wherein the longitudinal axis of the lens segment is not necessarily parallel to the principal axis of the illumination source, but is rather aligned with the principal local propagation vector of the light received from the light source, is an important technique for minimizing optical aberration and permitting more efficient "launch" of light into the fibers, and is not disclosed in any prior art known to the inventors.

Although exemplary embodiments of the invention have been shown and described, many changes, modifications, and substitutions may be made by one having ordinary skill in the art without necessarily departing from the spirit and scope of this invention.

What is claimed is:

1. An optical fiber manifold for coupling light from an illumination source to a plurality of output optical fibers, said output optical fibers each having a proximal end for receiving said light and said manifold including an illumination reflector for receiving illumination from said illumination source and redirecting the illumination to the proximal ends of each of said output optical fibers, said illumination reflector being made via a locus of mapped radiation patterns of the illumination source which are created using a database of the radiation patterns emitted by the illumination source in order to provide optimal distribution and intensity of illumination.

2. The optical fiber manifold as recited in claim 1, and further comprising a lens for converging said light separately on the core of each of the optical fibers.

3. The optical fiber manifold as recited in claim 2, wherein said lens comprises a plurality of segments, each having a discrete focal point, said segmented lens being adapted to converge the light from said illumination source and the proximal end of each of said optical fibers being located at the focal point of a corresponding segment for receiving light therefrom.

4. The optical fiber manifold as recited in claim 1, wherein said illumination source comprises a lamp.

5. The optical fiber manifold as recited in claim 1, wherein said illumination source comprises an input optical fiber adapted to transmit light from an originating source of illumination, such that said optical fiber manifold comprises a splitter for coupling said input optical fiber to said plurality of output optical fibers.

6. The optical fiber manifold as recited in claim 1, wherein said illumination reflector comprises a plurality of segments, each having a discrete focal point, said segmented lens being adapted to converge the light from said illumination source and the proximal end of each of said optical fibers being located at the focal point of a corresponding segment for receiving light therefrom.

7. The optical fiber manifold as recited in claim 1, wherein said illumination reflector comprises a pair of reflectors oriented back-to-back, with a portion of each reflector which includes the vertex area thereof being eliminated, said illumination source being located substantially centrally with respect to the pair of reflectors, each reflector thereby comprising a plurality of reflector segments which are each adapted to separately focus light from said illumination source onto the core of a corresponding output optical fiber.

8. The optical fiber manifold as recited in claim 1, wherein said illumination reflector comprises a pair of reflectors oriented back-to-back, with a portion of each reflector which includes the vertex area thereof being eliminated, said illumination source being located substantially centrally with respect to the pair of reflectors, a pair of output fibers located on opposite sides of said optical fiber manifold and coaxial with the other of said output fibers and said illumination source along the optical axis of said manifold, each of said reflectors being adapted to focus light from said illumination source onto the core of a corresponding one of said output fibers.

9. The optical fiber manifold as recited in claim 3, wherein the lens segments are unequally sized, each said lens segment being sized to compensate for varying loss factors in the optical fibers, such that the light exiting from the output optical fibers is adapted to have a substantially uniform intensity.

10. The optical fiber manifold as recited in claim 6, wherein the reflector segments are unequally sized, each said reflector segment being sized to compensate for varying loss factors in the optical fibers, such that the light exiting from the output optical fibers is adapted to have a substantially uniform intensity.

11. The optical fiber manifold as recited in claim 3, wherein the light approaching said lens may be de-centered to controllably vary light to each fiber.

12. The optical fiber manifold as recited in claim 6, wherein the light approaching said reflector may be de-centered to controllably vary light to each fiber.

13. The optical fiber manifold as recited in claim 3, wherein said lens segments are adapted to be in abutting structural relationship with the proximal ends of their corresponding output optical fibers, whereby the focal point of each lens segment is substantially coincident with its exit plane.

14. The optical fiber manifold as recited in claim 13, wherein said lens segments include an anti-reflective coating to minimize light losses between the lens segments and the output optical fibers.

15. The optical fiber manifold as recited in claim 3, wherein the plurality of segments which comprise said segmented lens are arranged circumferentially about a radial center of the lens.

16. The optical fiber manifold as recited in claim 3, wherein said segmented lens includes a radially central lens, and the remaining lens segments are arranged circumferentially about said central lens.

17. The optical fiber manifold as recited in claim 3, and further comprising a plurality of tapered light pipe extensions, each of said tapered light pipe extensions being adapted for attachment to one of said lens segment output ends.

18. A method of fabricating an optical component of an illumination system having an illumination source, the illumination system comprising an optical fiber manifold for coupling light from the illumination source to a plurality of output optical fibers and the optical component comprising an illumination reflector, the method comprising:
mapping the radiation patterns of the illumination source;
creating a database of the radiation patterns emitted by the illumination source; and
using the database to generate a configuration for the illumination reflector which provides an optimal distribution and intensity of illumination at a proximal end of each of said output optical fibers.

19. The method as recited in claim 18, wherein the mapping step comprises generating a collection of spatial intensity distribution measurements at a constant radial distance from the illumination source.

20. The method as recited in claim 19, wherein the spatial intensity distribution measurements are generated by moving a calibrated imaging detector array around the illumination source in spherical coordinates until a detailed file is obtained, point-by-point, of the source's specific radiation patterns.

21. An optical fiber manifold for coupling light from an illumination source to a plurality of output optical fibers, said output optical fibers each having a proximal end for receiving said light and said manifold comprising a lens having a plurality of segments which each have a discrete focal point, each of the segments having a longitudinal axis coincident with the principal local propagation vector of the light received from the illumination source and being adapted to converge the light from said illumination source to its respective focal point, the proximal end of each of said optical fibers being located at the focal point of a corresponding lens segment for receiving light therefrom.

22. The optical fiber manifold as recited in claim 21, wherein the manifold has a longitudinal principal axis, and the axis of at least one of said lens segments is not parallel to the longitudinal axis of said manifold.

23. The optical fiber manifold as recited in claim 1, wherein the illumination reflector has a non-circular cross-section and is non-elliptical and non-parabolic.

* * * * *